March 25, 1930.   J. E. PERRAULT ET AL   1,751,597
APPARATUS FOR MANIPULATING RUBBER TREADS FOR TIRES
Filed May 17, 1927   2 Sheets-Sheet 2
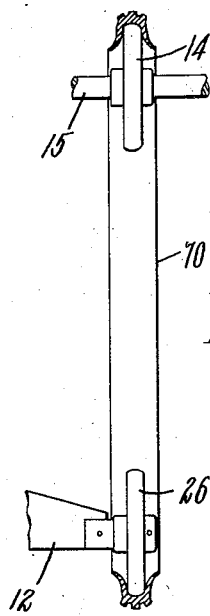
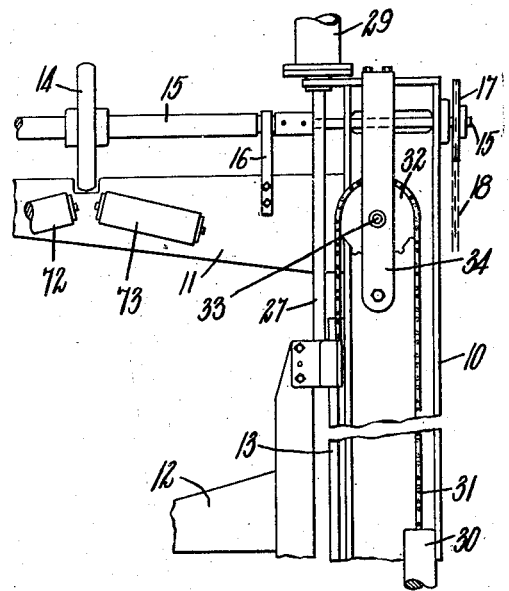
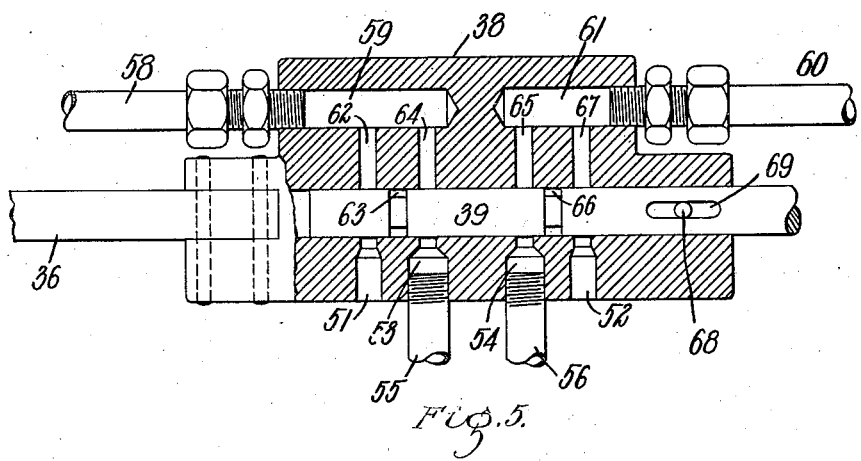

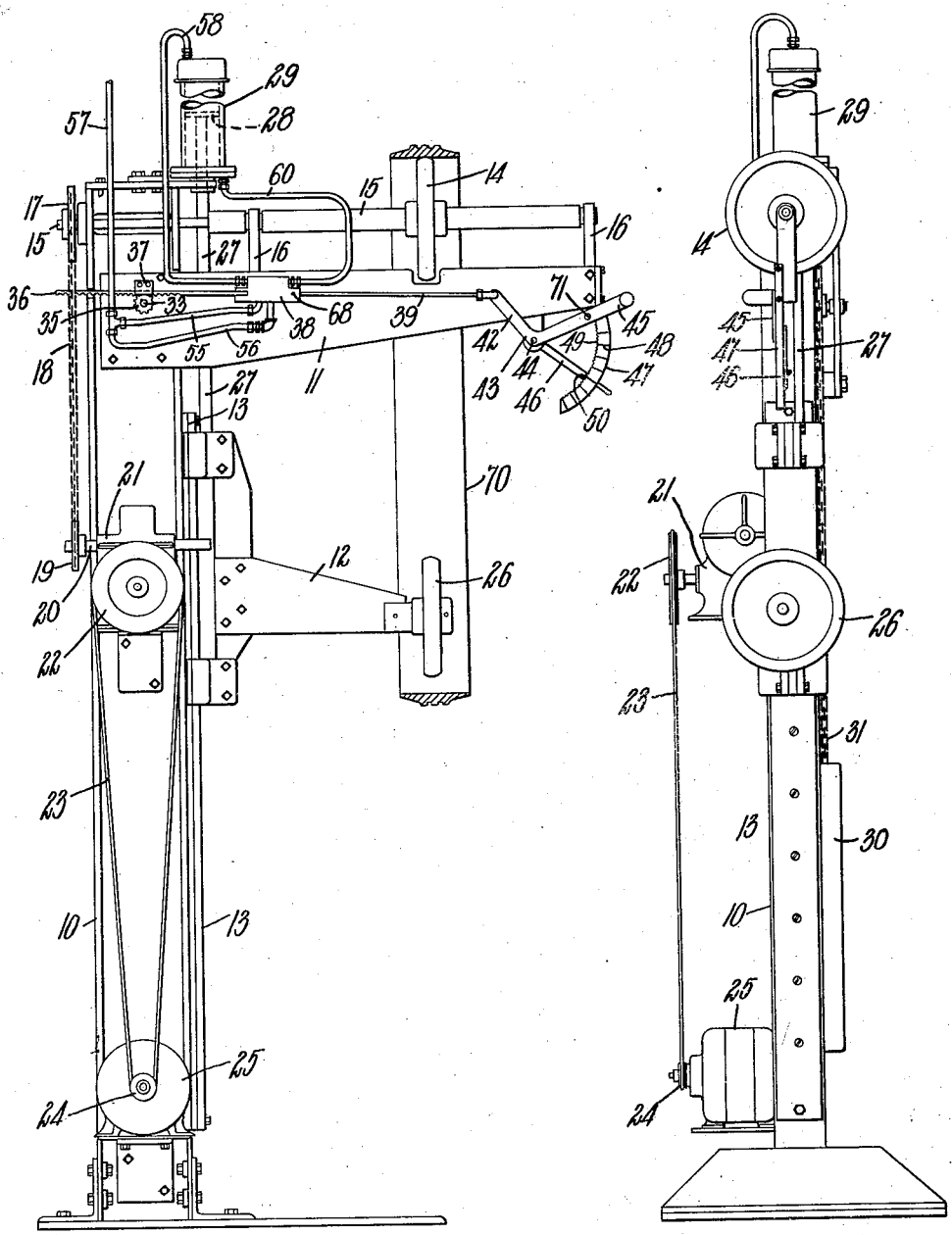

Patented Mar. 25, 1930

1,751,597

UNITED STATES PATENT OFFICE

JOSEPH E. PERRAULT, OF WATERTOWN, AND HOWARD G. ELLIS, OF WALTHAM, MASSACHUSETTS, ASSIGNORS, BY MESNE ASSIGNMENTS, TO HOOD RUBBER COMPANY, INC., OF WATERTOWN, MASSACHUSETTS, A CORPORATION OF DELAWARE

APPARATUS FOR MANIPULATING RUBBER TREADS FOR TIRES

Application filed May 17, 1927. Serial No. 192,111.

This invention relates to an improved method of and apparatus for manipulating rubber treads for tires.

In the manufacture of tires, the various layers which make up the so-called carcass are formed over a core. Over these layers or cores a rubber tread is laid. In making this tread, a weighed length of stock is formed into a ring or band of smaller diameter than the outside diameter of the portion of the tire already formed, namely, the cores, so that when the rubber tread is positioned on the cores it will draw tightly thereabout.

In order to draw a tread ring or band of this character over the tire body or carcass considerable exertion is necessary to stretch it, and especially is this the case where the band is a heavy and thick one, and due to its tackiness and that of the rubberized fabric over which it is drawn, cloth wrappers are inserted between the rubber tread and the carcass upon which it is being placed during this operation of positioning the tire tread upon the carcass. After the tread is properly positioned upon the carcass these wrappers are pulled out.

It is the object of this invention to conserve the operator's strength and render the operation of positioning the tire tread on the carcass much easier and also much more perfect and efficient, and also, the object of the present invention is to eliminate the use of a wrapper.

In order to secure these objects a temporary stretch is given to the tire tread along the median peripheral portion thereof, the portion of the tire tread adjacent the opposite edges being left comparatively in its normal condition, that is to say, unstretched. The tire tread thus being stretched along the central portion thereof facilitates to a great degree the easy and exact assembly and attachment to the carcass free from wrinkles.

Immediately after leaving the apparatus, whereby the tire tread is stretched temporarily along its central portion and throughout its entire circumference, the tread starts to shrink and approaches its original diameter before it was stretched.

The apparatus of this invention enables the tread to be stretched to a predetermined extent, that is, to an extent where the tread will begin to seize on the tire at the time when it is properly assembled thereon. Moreover, the apparatus is capable of adjustments so that treads of various sizes can be properly stretched the desired amount in order that they may be positioned upon the carcass for which they are intended.

The invention consists in the method of and apparatus for manipulating rubber treads for tires hereinafter set forth in the specification and particularly pointed out in the claims thereof.

Referring to the drawings:—

Figure 1 is a front elevation of an apparatus embodying the invention of this application, a tire tread being shown in sectional elevation thereon before it has been stretched by the apparatus.

Fig. 2 is a side elevation taken from the right of Fig. 1.

Fig. 3 is a rear elevation of a portion of the apparatus, the same being broken away.

Fig. 4 is a front elevation of the stretching wheels and a portion of their supports, with the tire tread shown stretched in sectional elevation in connection therewith.

Fig. 5 is a front sectional elevation of a pneumatic valve chamber and valve forming a portion of the apparatus of this invention.

Like numerals refer to like parts throughout the several views of the drawings.

In the drawings, 10 is the frame of the machine, to which is fastened a stationary member or arm 11, and upon which is slidably mounted a movable member or arm 12. The arm 12 is guided on ways 13 on the frame 10.

An expander wheel 14 is fastened to a shaft 15 which is rotatably mounted in bearings 16 on the stationary arm 11. The shaft 15 has a sprocket gear 17 fast thereto, which is connected by a sprocket chain 18 to another sprocket gear 19. Rotary motion is imparted to the sprocket gear 19 by a shaft 20 which is rotated by a worm gear reduction mechanism provided in a casing 21, which is fastened to the frame 10. The worm gear reduction mechanism being driven by a pulley 22, belt 23, pulley 24 and motor 25, the motor being fastened to the frame 10.

The arm 12 has an expander wheel 26 rotatably mounted thereon, and said arm has a vertical movement imparted thereto away from and toward the stationary arm 11 by a piston rod 27 which has at its upper end a piston 28 fast thereto and located within a pneumatic cylinder 29.

A counterweight 30 has a sprocket chain 31 connected thereto, the said chain passing over a sprocket wheel 32 and thence extending downwardly and being fastened to the upper end of the movable member 12, see Fig. 3. The sprocket wheel 32 is fast to a shaft 33 which is rotatably mounted upon a bracket 34 fast to the frame 10 and is also rotatably mounted in the stationary arm or member 11. The end of the shaft opposite that to which the sprocket wheel 32 is fastened has a pinion 35 which meshes into a rack 36, slidably mounted in a bracket 37 fast to the arm 11, and fastened at one end thereof to a floating valve chamber 38. The valve chamber 38 has a cylindrical valve 39 slidably mounted therein and connected at one end to an arm 42 of a lever 43 which is pivoted at 44 to the stationary member or arm 11 and has another arm 45 by which the arm 42 may be rocked upon the pivot 44. A stop arm 46 is pivoted at 44 and may be moved along in contact with a segmental arm 47 provided with graduations 48, whereby the arm 46 can be set at any desired angle or position relatively to the arm 45, and held in position by a toothed rack 49 and spring-actuated pawl 50.

The valve chamber 38 is provided with exhaust ports 51 and 52, which open into the atmosphere. Supply ports 53 and 54 are connected by pipes 55 and 56 to a common supply pipe 57, which leads to a source of supply of compressed air. The upper end of the air cylinder 29 is connected by a pipe 58 to a chamber 59 in the valve chamber 38. The lower end of the air chamber is connected by a pipe 60 to an air chamber 61 in the valve chamber 38.

When the valve 39 is in the correct position so to do, a port 62 connects the chamber 59 to the exhaust port 51 through an annular passage 63 in the valve 39 and the supply port 53 is connected to the chamber 59 through a port 64. The chamber 61 is connected by a port 65 to the supply port 54 through an annular passage 66 in the valve 39, and the chamber 61 is connected to the exhaust port 52 through a port 67 and the annular passage 66 in the valve 39, when said valve is in the correct position. A cross pin 68, fast to the valve chamber 38, projects into a slot 69 in the valve 39.

The operation of the apparatus hereinbefore specifically described is as follows:—

Assuming a tire tread 70 to be placed upon the expander wheel 14, extending downwardly therefrom beneath the expander wheel 26, as illustrated in Fig. 1, the stop arm 46 having been positioned for the correct amount of stretch desired for the tire tread, the operator now pushes downwardly upon the arm 45 of the lever 43, thus moving the valve 39 toward the right from the position illustrated in Fig. 5 to a position where the annular passages 63 and 66 are brought into alignment with the ports 64 and 67, whereupon compressed air entering the pipe 55 from the pipe 57 will pass through the port 64 into the chamber 59, through the pipe 58 to the top of the air cylinder 29, thus driving the piston 28 downwardly and the exhaust from the cylinder 29 will pass through the pipe 60 to the chamber 61 in the valve chamber 38 and thence through the port 67 and annular passage 66 and outwardly through the exhaust port 52.

As the piston 28 descends, it will move the piston rod 27 downwardly together with the movable member or arm 12 and the expander wheel 26 which is rotatably mounted thereon, and this downward movement will continue until a pin 71 fast to the arm 45 engages the stop arm 46. During this downward movement the valve chamber will be moved toward the right, Fig. 5, by the rack 36 and pinion 35, to which a rotary movement is imparted in the proper direction, or a clockwise direction, Fig. 1, by the rotation of the shaft 33 which is rotated by the sprocket wheel 32 and sprocket chain 31 which is connected at one end to the counterweight 30 and at the other end to the arm 12, which is being moved downwardly, as hereinbefore described, by the piston rod 27 and piston 28.

The valve 39 stops its movement toward the right when the stop pin 71 strikes the arm 46, but the movement of the valve chamber 38 will continue toward the right after the valve 39 stops until the port 67 is moved out of alignment with the annular passage 66 and the port 64 is moved out of alignment with the passage 63. In other words, until the valve chamber and valve assume the same relative positions as shown in Fig. 5, that is, when the valve is in a neutral position with relation to the valve chamber, the downward movement of the piston will then stop.

The rotary movement of the expander wheel 14, driven from the motor 25, will continue, the expander wheel 26 also rotating by reason of frictional contact with the tire tread 70 as long as the operator desires, and the tire tread will travel around the expander wheel, having a stretch imparted thereto along the entire median peripheral portion thereof, as illustrated in Fig. 4. When the tire tread has been thus expanded, the operator moves the arm of the lever upwardly, thus moving the valve 39 from the neutral position in Fig. 5 toward the left until the annular passage 66 is brought into alignment with the ports 65 and 54 and the annular passage 63 is brought into alignment with the ports 62 and 51, whereupon the movement hereinbefore set forth will be reversed and the wheel 26 and arm 12 moved upwardly out of contact with the tire tread until the stop pin 71 engages a stationary member and the valve 39 is again moved into the neutral position illustrated in Fig. 5, whereupon the operator removes the tire tread 70 from the machine and it is then placed upon the carcass of a tire, which in turn is at that time supported upon an annular form and the tire tread is shaped to the carcass in a manner well known to those skilled in the art.

During the expanding of the tire the edges are guided by a pair of idler rolls 72 and 73 which are rotatably mounted upon the stationary arm 11. The tread having been stretched along the central line throughout its entire periphery to a predetermined extent is easily assembled upon the carcas and formed thereto free from wrinkles.

Immediately after being removed from the tire expanding apparatus, the tire tread begins to shrink to approach its original diameter and the tire has been stretched just the proper extent so that the tread will begin to seize on the carcass at the time when it is properly assembled thereon. The amount of stretch imparted to the tire is evidently governed by the distance to which the arm 12 and expander wheel 26 move downwardly or away from the expander wheel 14 and this is governed by the position of the stop arm 46. The stop arm 46 is positioned by the operator in alignment with one of the graduations for the particular size tire tread which is to be expanded. The graduations 48 having been obtained by calculation and experiment for different diameters and thicknesses of treads.

In the specification and claims the terms "tire tread" and "tread ring" have been used. It is to be understood, however, that the method and apparatus of this invention are not restricted to use with the specific article known as a tire tread, but that the invention may also be used for stretching tire bands which are used inside the tire tread, or any other ring or band of plastic stretchable material.

We claim:

1. A tire tread expander having, in combination, a pair of rotary expander wheels upon which a tire tread may be positioned, the width of the rims of said wheels measured longitudinally of their axes being substantially less than the width of the tire tread, and means to move one of said wheels away from and toward the other.

2. A tire tread expander having, in combination, a pair of rotary expander wheels upon which a tire tread may be positioned, the peripheries of said wheels being convexly curved transversely thereof, and of a width substantially less than the width of said tire tread measured longitudinally of their axes and means to move one of said wheels away from and toward the other.

3. A tire tread expander having, in combination, a pair of rotary expander wheels upon which a tire tread may be positioned, a stationary member upon which one of the wheels is rotatably mounted, a pair of guide rolls positioned upon opposite sides and below said last-named wheel, a movable member upon which the other wheel is rotatably mounted, and means to move said movable member and its wheel away from and toward the stationary member and its wheel.

4. A tire tread expander having, in combination, a pair of rotary expander wheels upon which a tire tread may be positioned, a stationary member upon which one of the wheels is rotatably mounted, mechanism to impart a rotary motion to said wheel, a movable member upon which the other wheel is rotatably mounted, and means to move said movable member and its wheel away from and toward the stationary member and its wheel and a pair of oppositely disposed guide rolls positioned on said stationary member and below its wheel.

5. A tire tread expander having, in combination, a pair of rotary expander wheels upon which a tire tread may be positioned, a stationary member upon which one of the wheels is rotatably mounted, a movable member upon which the other wheel is rotatably mounted, a pneumatic cylinder and piston, and a piston rod therefor connected to said movable member, whereby the movable member and its wheel may be moved away from and toward the stationary member and its wheel and a pair of oppositely disposed guide rolls positioned on said stationary member and below its wheel and inclined downwardly on opposite sides of a vertical plane containing said last named wheel.

6. In a device of the character described a valve control mechanism having, in combination, a stationary member, a movable member, a pneumatic cylinder and piston, a piston rod therefor connected to said movable member, a floating valve member connected to a source of pneumatic power through said pneumatic cylinder, a valve in said valve chamber, and means to actuate said valve to reverse the movement of said piston and piston rod, whereby the movable member may be moved away from and toward the stationary member.

7. In a device of the character described a valve control mechanism having, in combination, a stationary member, a movable member, a pneumatic cylinder connected to a source of power, a piston in said pneumatic cylinder, a piston rod therefor connected to said movable member, a floating valve chamber connected to said pneumatic cylinder, a valve in said valve chamber, manually operable means to move said valve from a neutral to an operative position, whereby said movable member may be moved away from said stationary member, and means operated by the movement of said movable member a predetermined distance to move said valve chamber from an operative to a neutral position, whereby the movement of said movable member may be thereby stopped.

8. In a device of the character described a valve control mechanism having, in combination, a stationary member, a movable member, a pneumatic cylinder connected to a source of power, a piston in said pneumatic cylinder, a piston rod therefor connected to said movable member, a floating valve member connected to a source of pneumatic power through said pneumatic cylinder, a valve in said valve chamber, a lever connected to said valve, whereby the valve may be manually moved from a neutral to an operative position and said movable member may thereby be moved away from said stationary member, a stop for said lever, means operated by the movement of said movable member to move said valve chamber and valve and lever until the lever engages said stop and further movement of said valve is also stopped while said valve chamber continues to be moved until in a neutral position and thereby the movement of said movable member may be stopped.

9. In a device of the character described a valve control mechanism having, in combination, a stationary member, a movable member, a pneumatic cylinder connected to a source of power, a piston in said pneumatic cylinder, a piston rod therefor connected to said movable member, a floating valve chamber connected to said pneumatic cylinder, a valve in said valve chamber, manually operable means to move said valve from a neutral to an operative position, whereby said movable member may be moved away from said stationary member, a rack fast to said valve chamber, a pinion meshing said rack and rotatably mounted upon a stationary member, and means operated by the movement of said movable member a predetermined distance to rotate said pinion and move said rack and valve chamber from an operative to a neutral position, whereby the movement of said movable member may be thereby stopped.

10. In a device of the character described a valve control mechanism having, in combination, a stationary member, a movable member, a pneumatic cylinder connected to a source of power, a piston in said pneumatic cylinder, a piston rod therefor connected to said movable member, a floating valve chamber connected to said pneumatic cylinder, a valve in said valve chamber, manually operable means to move said valve from a neutral to an operative position, whereby said movable member may be moved away from said stationary member, and means operated by the movement of said movable member a predetermined distance to move said valve chamber from an operative to a neutral position, whereby the movement of said movable member may be thereby stopped, whereupon said manually operable means may be again actuated to move said valve in the opposite direction from a neutral to an operative position, whereby said movable member may be moved toward said stationary member and the said second-named means again operated to move said valve chamber from an operative to a neutral position, whereby the movement of said movable member may be again stopped.

In testimony whereof we have hereunto set our hands.

JOSEPH E. PERRAULT.
HOWARD G. ELLIS.